Sept. 13, 1955 W. L. GILL 2,717,610
VENT PLUGS FOR AIRCRAFT STORAGE BATTERIES
Filed Sept. 15, 1954

*INVENTOR.*
WALTER L. GILL
BY
*Shepherd Campbell*

2,717,610
VENT PLUGS FOR AIRCRAFT STORAGE BATTERIES

Walter L. Gill, Redlands, Calif.

Application September 15, 1954, Serial No. 456,098

2 Claims. (Cl. 137—43)

This invention relates to vent plugs for aircraft storage batteries.

It has for its object to provide a simple, inexpensive and rugged device of this nature which while it will function to permit the escape of gases generated in the normal functioning of such batteries, will prevent the spilling or escape of any of the liquid electrolyte, throughout all positions of tipping or even complete inversion of an airplane upon which the battery is located.

The manner of securing the desired result and the advantages flowing therefrom will be best understood by reference to the accompanying drawing in which.

Like numerals designate corresponding parts in all of the figures of the drawing.

Figure 1:
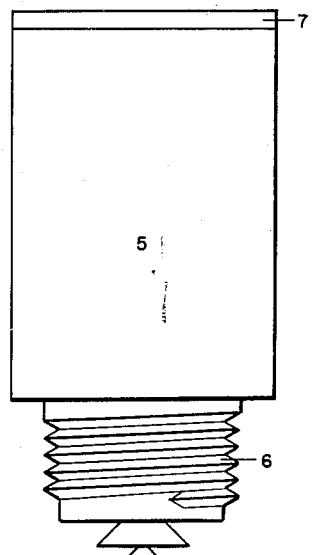
Fig. 1 is a side elevation of the vent plug.
Figure 2:
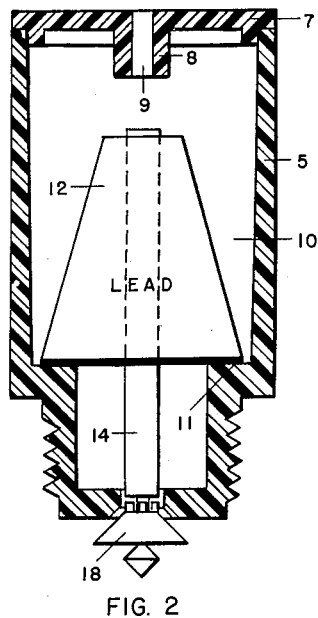
Fig. 2 is a central vertical sectional view showing the parts in the position they occupy when the plug is in upright position.

In the drawing 5 designates a hollow, cup-like body of so-called hard rubber or any other artificial resinous or plastic material, that is sufficiently rigid and acid resistant to serve the desired purpose. A threaded extension 6 is adapted to be screwed into the filler opening of the battery (not shown) so that the body 5 will partake of all tipping motion of the battery.

The top of the body 5 is sealed by a cap 7 and this cap carries an inwardly extending neck 8, having vent opening 9 therethrough. The neck extension projects far enough into body 5 to trap any limited amount of electrolyte which by condensation, or otherwise, might accumulate in upper chamber 10 of the plug. A ledge 11 formed in body 5 constitutes a seat for a tapering and tiltable weight 12, which is preferably made of lead. A small channel 13 formed across the underside of the weight, permits drainage of any condensate from chamber 10 back into the battery.

The weight is compressed, in manufacture, into secure engagement with a stout flexible and resilient elongated rubber projection 14.

A metallic valve stem 15 of an acid resistant material, such as stainless steel, is molded into and thus rigidly affixed to the rubber projection 14. A preferably integral, metallic valve 16 is formed upon the lower end of stem 15 and coacts with a valve seat 17 of a flexible rubber valve 18. Valve 18 has a passage 19 through it at the lower end of which valve seat 17 is formed. The valve 18 coacts with valve seat 20 located upon the bottom of the plug.

Figure 3:
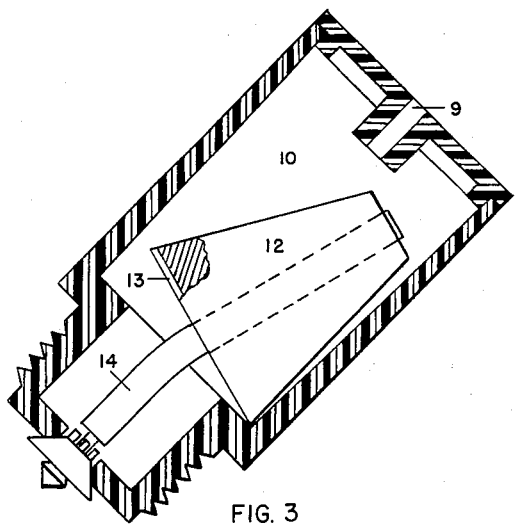
Fig. 3 is a sectional view showing the parts in the position which they occupy when the plug is in tipped position.
Figure 4:
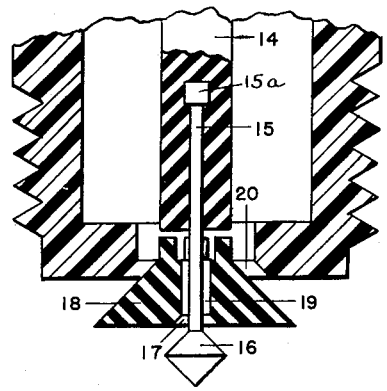
Fig. 4 is a fragmentary sectional view through the lower end of the plug showing the two valves, hereinafter described, in open position.

The operation of the device is as follows:

With the parts in the position of Figs. 1 and 4, both of the valves are open and the weight 12 is seated squarely upon ledge 11. If, in the operation of an airplane, or for any other reason, the battery is tilted to an angle of say from 42° to 48°, the lead weight tips as indicated in Fig. 3, and rubber projection 14 is drawn upon, moving valve 16 against seat 17, this, in turn drawing valve 18 against seat 20. This seals the plug against the passage of any electrolyte therethrough, even though the plane and battery be completely inverted. One possibility which has to be guarded against in plugs of this nature is that internal pressure in the battery may be built up during tipping or inversion, to such degree that this pressure would hold a vent valve closed even after the plug resumed its upright position. It is to prevent such a condition that this invention employs the two cooperating valves, one of which, to wit 16, is movable against a pressure high enough to keep valve 18 closed. Opening of this high pressure valve 16 initially relieves the internal pressure in the battery and permits the weight to resume its seat on the ledge with resultant opening of the larger low pressure valve 18, either by gravity or by being forced from its seat by the lower end of projection 14. It will be observed that the rubber stem or projection 14 functions to draw two valves to yielding seating upon their respective valve seats. It draws valve 16 to its seat upon seat 17 and then draws valve 18 to its seat upon seat 20. Thus while it effects a secure seating of both valves it does so through rugged and reliable mechanism which does not require any such accurate adjustment of throw of the parts as would be the case if both valves were independently seated by rigid connections. Further the capability of the rubber projection 14 to bend, permits both valves to remain in axial alignment with each other throughout the tipping of the weight in any and all directions.

The opening of valve 18 permits the free escape of any accumulated gases as well as the free escape of any additionally generated gases while the plug remains upright. To prevent contact of valve 18 with the lower end of tube 14 from closing the channel or port 19 of said valve, spaced lugs 21 are provided upon the top of valve 18 the spaces between which permit escape of gas through valve 18 whenever valve 16 is dislodged from its seat as the weight begins to rock back to vertical position. If the device be completely inverted the weighted body 12 will be held suspended upon projection 14 and thus be held in position to resume its seat upon the ledge as the device returns to upright position. The projection 14 has been referred to as being made of rubber. This term is to be generically construed to cover either natural or artificial rubber. It is only necessary that this projection have the elasticity and flexibility of rubber to the degree to permit the bending of the same (see Fig. 3) to such an extent that the lower portion of such projection and the metallic stem 15 therein may remain in axial alignment with the two valve seats 17 and 20 throughout the tipping of the weight. By referring to Fig. 4 it will be seen that the stem 15 is quite slender in comparison with the thickness of projection 14. This is an important feature because it is essential that a rubber member, which must support the suspended lead weight, when the structure is inverted, be of such thickness and strength as to stand the resultant strain over extended periods of time. The metallic stem, upon the other hand is desirably quite slender so that the diameter of opening 19 through valve 18 may be kept small. This renders it possible to use a very small high pressure valve 16 to close opening 19. It is clear that the smaller the area of valve 16 the higher will be the pressure against which it will open under a given degree of movement of weight 12. It will also be seen by reference to Fig. 4 that the stem 15 has an enlarged head 15a which, aids in securely holding the stem 15 against endwise movement with respect to projection 14.

The device of this invention has been found to efficiently function to vent batteries while completely preventing escape of electrolyte, throughout all conditions of use and it does this by means of great simplicity, low cost and of such ruggedness as to be very long-lived. However it is to be understood that the invention is not limited to the precise construction set forth but that it includes within its purview whatever changes fairly come within either the terms or the spirit of the appended claims.

I claim:

1. A structure of the character described comprising a rigid hollow body, means for mounting the same rigidly in the filler opening of a battery, for bodily tipping with the battery in all directions, an inwardly projecting seat in said body, a weighted body shaped to be held in an upright position upon said seat when the body is in an upright position and being bodily tiltable therefrom in all directions, an elongated flexible and resilient rubber projection extending downwardly from the bottom of said weighted body, and affixed axially in said body, a high pressure valve of acid resistant metal comprising a slender elongated stem and a valve head upon the lower end of said stem, said stem being much smaller in diameter than said projection and comprising an upper portion which is rigidly affixed axially in the lower portion of the rubber projection and a lower portion which projects below the lower end of said rubber projection, a low pressure valve of rubber of larger area than the high pressure valve having a vertical central orifice therethrough, through which the stem of the high pressure valve passes, said orifice being larger in diameter than said stem, a valve seat upon the under face of the low pressure valve and terminating said orifice and with which the high pressure valve coacts, and a valve seat upon the bottom of the hollow body with which the low pressure valve coacts, the top of the stem terminating at a point enough short of the point of attachment of the rubber projection to the weighted body to leave a section of the projection free to bend as the weighted body tips in any direction.

2. A structure as recited in claim 1 wherein the said slender stem has a headed upper end which is embedded in the material of the rubber projection.

References Cited in the file of this patent

UNITED STATES PATENTS

| | | |
|---|---|---|
| 1,155,005 | Pozzi | Sept. 28, 1915 |
| 2,221,542 | Hopkins | Nov. 12, 1940 |
| 2,405,736 | Dailey et al. | Aug. 13, 1946 |
| 2,619,102 | Endress | Nov. 25, 1952 |